United States Patent [19]
Mun et al.

[11] Patent Number: 5,841,444
[45] Date of Patent: Nov. 24, 1998

[54] MULTIPROCESSOR GRAPHICS SYSTEM

[75] Inventors: Byung-in Mun, Cheonan; Kil-su Eo, Seoul, both of Rep. of Korea

[73] Assignee: Samsung Electronics Co., Ltd., Kyungki-Do, Rep. of Korea

[21] Appl. No.: 823,041

[22] Filed: Mar. 21, 1997

[30] Foreign Application Priority Data

Mar. 21, 1996 [KR] Rep. of Korea .................... 1996-7730

[51] Int. Cl.⁶ ........................................... G06T 1/20
[52] U.S. Cl. ................... 345/506; 345/505; 395/200.81; 395/800.11
[58] Field of Search .................................. 345/502, 505, 345/506, 507–509, 511; 395/306, 200.3, 200.5, 200.81, 800.11, 800.14

[56] References Cited

U.S. PATENT DOCUMENTS 5,758,045  5/1998  Moon et al. ............................. 345/422

FOREIGN PATENT DOCUMENTS 4-113444  4/1992  Japan .............................. G06F 15/16
6-44382   2/1994  Japan .............................. G06F 15/72

OTHER PUBLICATIONS

IEEE Computer Soc. Press, "A Multiprocessor System Utilizing Enhanced DSP's for Image processing", H. Ueda et al., pp. 611–620, May 25–27, 1988.

Proceedings of the 5th International Conference on Image Analysis and Processing, "A dataflow image processing system TIP–4", Fujita et al., pp. 734–741, Sep. 20–22, 1989.

Computer Graphics, vol. 26, "PixelFlow: High–speed rendering using image composition", by S. Molnar et al., pp. 231–240, Jul. 2, 1992.

*Primary Examiner*—Kee M. Tung
*Attorney, Agent, or Firm*—Sughrue, Mion, Zinn, Macpeak & Seas, PLLC

[57] ABSTRACT

A multiprocessor graphics system having a pixel link architecture, includes: 1) a plurality of sub-graphics systems each of which assigned to each of a plurality of sub-screens provided by sectioning a display screen; and 2) a ring network for connecting the plurality of sub-graphics systems. Each of the sub-graphics systems includes a geometry engine, a raster engine, a local frame buffer and a pixel distributor. An interconnection network bottleneck between the raster engine and frame buffer is removed and a conventional memory system can be used by reducing the number of data transmissions between the raster engine and frame buffer while maintaining image parallelism and object parallelism.

8 Claims, 2 Drawing Sheets

MULTIPROCESSOR GRAPHICS SYSTEM

FIELD OF THE INVENTION

The present invention relates to a multiprocessor graphics system. More particularly, the present invention relates to a multiprocessor graphics system in which a local frame buffer is assigned to each raster engine so that data traffic between a raster engine and a frame buffer is reduced and an interconnection network bottleneck problem between the raster engine and the frame buffer is removed while image parallelism and object parallelism are maintained, and which has a pixel link architecture that can use the conventional memory system.

BACKGROUND OF THE INVENTION

Generally, a graphics system has a pipeline structure in which a geometry engine, a raster engine and a frame buffer are arranged sequentially.

The geometry engine performs floating point operations such as transformation, clipping, light calculation and projection, etc.

The raster engine calculates RGB color values, a z-depth value and coordinates of each pixel processed in the geometry engine. The raster engine is roughly constituted by a span generator and a span interpolator.

The span generator receives a polygon as its input and divides the polygon into a plurality of spans. Also, the span divides the polygon into a plurality of spans. Also, the span generator receives RGB color values and z-depth value of each of the vertices of the polygon, and the differences of RGB and z-depth values between vertices, i.e., $\Delta xR$, $\Delta xG$, $\Delta xB$, $\Delta xZ$, $\Delta yR$, $\Delta yG$, $\Delta yB$ and $\Delta yZ$ to generate span data. The span interpolator receives span data such as RGB and z-depth values of the left point of a span, data for the size of the span, and $\Delta xR$, $\Delta xG$, $\Delta xB$ and $\Delta xZ$ from the span generator, and interpolates the RGB and z-depth values of pixels in the span.

The frame buffer is a memory which stores pixel data calculated in the raster engine.

Research and development of a multiprocessor graphics system have focused on a floating point geometry processing procedure which accelerates a transformation of the primitives and a clipping in the geometry engine, the provision of a frame buffer having a higher bandwidth which enables high speed read and write operations of the raster engine, and the removal of interconnection network bottleneck occurring between the geometry engine and the raster engine and between the raster engine and the frame buffer.

The multiprocessor graphics systems which have been developed can be categorized into three types; an image parallel architecture, an objective parallel architecture and a hybrid architecture.

The image parallel architecture is adopted in most of the commercial graphics systems currently being used. The architecture basically aims at dividing a frame buffer (1280*1024) to remove an access bottleneck of the frame buffer. For example, the IRIS 4D GTX system manufactured by Silicon Graphics Incorporation removes the access bottleneck of the frame buffer by dividing the frame buffer in a 20-way interleaved fashion. However, such an architecture shows an interconnection network bottleneck between the geometry engine and the raster engine when the system processes more than several millions of polygons a second.

The objective parallel architecture is mostly developed for use in laboratories. An example of the architecture is the NASA II which is provided by General Electric Company. However, the architecture requires a specialized processor. Furthermore, an interconnection network bottleneck between the raster engine and frame buffer is generated when several millions of polygons should be processed in a second, as in the image parallel architecture. Thus, a special memory is required in which some processing circuitry is combined on the same chip with dense memory circuits to obtain much higher memory bandwidth.

The hybrid architecture is a combination of the image parallel architecture and object parallel architecture. One typical example is the Pixel-Planes 5 which employs an approach using screen subdivision. As shown in FIG. 1, the Pixel-Planes 5 removes the interconnection network bottleneck problem between the geometry engine and the raster engine by using a ring network architecture. However, since the geometry engine and the raster engine are not tightly coupled, an overhead is required in order to sort the objects processed in the geometry engine so that raster engines assigned to corresponding sub-screens process the objects. Moreover, in the hybrid architecture, each of the raster engines is dynamically allocated to the sub-screens in order to achieve a load balancing between raster engines. However, it is difficult to control the dynamic allocation scheme.

SUMMARY OF THE INVENTION

To overcome the above problems, it is an object of the present invention to provide a multiprocessor graphics system in which a local frame buffer is assigned to each raster engine so that data traffic between a raster engine and a frame buffer is reduced and an interconnection network bottleneck problem between the raster engine and the frame buffer is removed while image parallelism and object parallelism are maintained, and which has a pixel link architecture that can use the conventional memory system.

To achieve the above object, there is provided a multiprocessor graphics system having a pixel link architecture, comprising: a plurality of sub-graphics systems each assigned to each of a plurality of sub-screens provided by sectioning a display screen; and a ring network for connecting said plurality of sub-graphics systems, wherein each of said sub-graphics systems comprises: a geometry engine for receiving three dimensional object data from a host processor and performing a floating point operation including transformation, lighting for reflecting the effect of light on color, clipping, perspective projection and triangle division; a raster engine for calculating the color value, a z-depth value and coordinates of each pixel processed in the geometry engine and performing triangle rasterization, interpolation and bit block transmission; a local frame buffer for storing data belonging to a sub-screen assigned to itself; and a pixel distributor for receiving data processed in said raster engine, checking a pixel address, storing said data in said local frame buffer if said pixel address belongs to its own local frame section, and transmitting said data to another sub-graphics system via said ring network if said pixel address does not belong to its own local frame section.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

The present invention adopts a token ring architecture in a graphics system having a hybrid architecture. Specifically, advantages of the object parallelism are obtained by removing overhead necessary for sorting objects for each sub-screen in a geometry engine by tightly coupling a geometry engine and a raster engine. Also, advantages of image parallelism are obtained by incorporating the raster engine and a local frame buffer in a unit.

Figure 1:
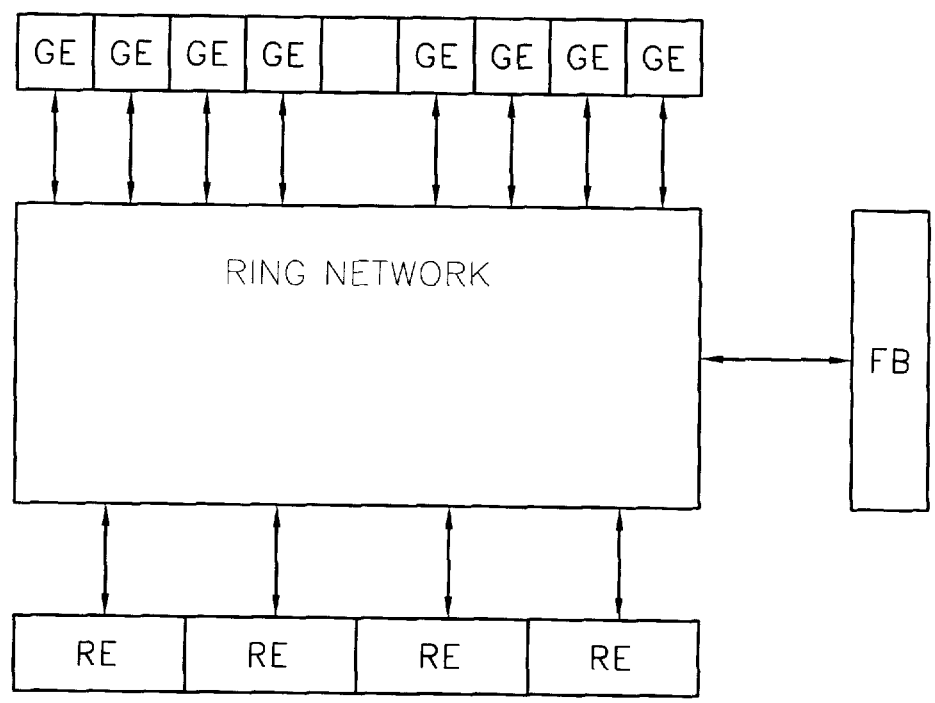
FIG. 1 is a schematic diagram of a Pixel-Planes 5 system.
Figure 2:
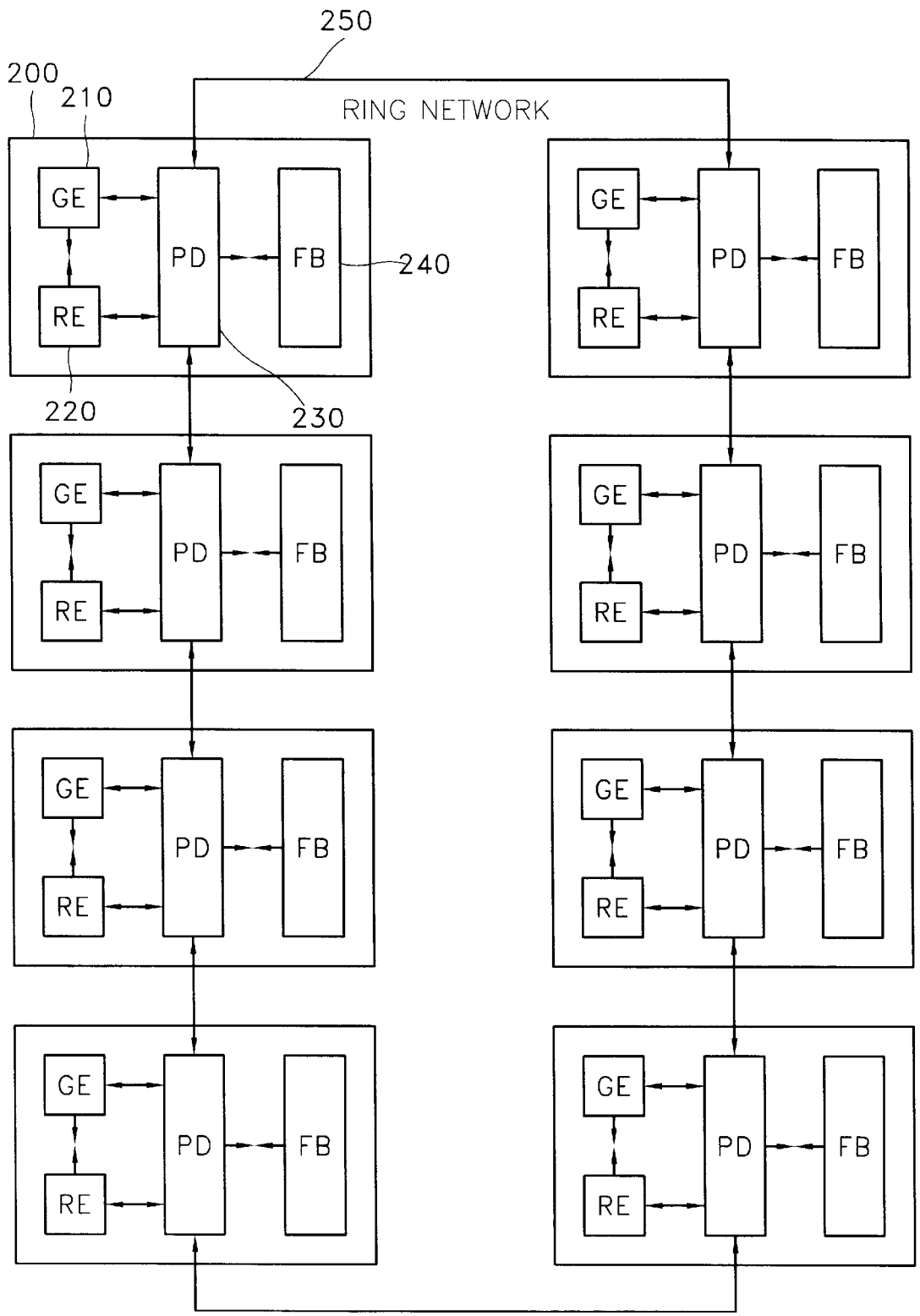
FIG. 2 is a block diagram of multiprocessor graphics system having a pixel link architecture according to the present invention.

FIG. 2 is a block diagram of a multiprocessor graphics system having a pixel link architecture according to the present invention. The multiprocessor graphics system includes a plurality of sub-graphics systems 200 and a ring network 250 for connecting the plurality of sub-graphics systems.

Each of the sub-graphics systems 200 is assigned to each of a plurality of sub-screens generated by dividing a display screen section into plural sections. In addition, the sub-graphics system 200 includes a geometry engine (GE) 210, a raster engine (RE) 220, a pixel distributer (PD) 230 and a local frame buffer (FB) 240.

The geometry engine 210 receives three-dimensional object data from a host processor (not shown), and carries out floating point operations such as a transformation, lighting for reflecting the effect of light to color, clipping, perspective projection and triangulation. Also, the geometry engine 210 has a considerable amount of local codes and data.

The raster engine 220 is a pixel processor having its own controller. The raster engine 220 calculates the color value, z value and coordinates of each pixel processed in the geometry engine 210 and carries out triangle rasterization, interpolation and bit block transmission.

The local frame buffer 240 is constituted by a general double buffer video RAM, and stores data belonging to a screen assigned to itself. In case that the multiprocessor graphics system is constituted of 8 sub-systems as shown in FIG. 2, there will be no bottleneck problem in connection with writing data in and reading from the frame memory since the general video RAM can transmit data at a rate of 320M bits/second via a data bus of 32 bits when it operates at a rate of 10 MHz in reading, comparing or writing operations while a data transmission rate of 144M bits per second (1280 * 1024 * 32 bits/pixel * 24 frames/sec * ⅛ (for RGB)+1280 * 1024 * 16 bits/pixel * 24 frames/sec * ⅛ (for z)=144 Mbps) is required in an interactive real-time application.

The pixel distributor 230 receives data processed in the raster engine 220 and checks a pixel address. If the pixel address belongs to its own local frame section, the data is stored in the local frame buffer 240. If the pixel address does not belong to its own local frame section, the data is transmitted to another sub-graphics system via the ring network.

Also, the pixel distributor 230 generates or extinguishes a pixel token to control a data transmission via a ring network so that the data is transmitted via a shorter path in the ring network which is a duplex linked network when the data is transmitted to another sub-graphics system. The pixel token is a command header used for indicating a transmission direction of data according to the testing result of a pixel address when data of a color value and a z-depth value, etc. is transmitted from the sub-graphics system 200 having the geometry engine 210, raster engine 220, pixel distributor (PD) 230 and local frame buffer (FB) 240 to another sub-graphics system. The pixel token is constituted of valid/invalid bits for each sub-graphics system and a size value of accompanying data.

The ring network 250 has a duplex linked ring architecture in which data can be transmitted clockwise and counterclockwise. The ring network 250 which connects the local frame buffer 240 via the pixel distributor 230 is a multi-channel token ring network having a larger bandwidth, and is controlled by the pixel distributor 230. The ring network 250 transmits data by using the token.

Generally, in a system using z buffer algorithm for real-time interactive application, a ring network having a bandwidth of 4800M bits (1M * 10 pixel/polygon * bits/pixel/sec=4800 Mbits/sec) is required to process a 1M polygon. Also, 8 simultaneous tokens (or messages) are necessary in the pixel link architecture constituted by 8 sub-graphics systems as shown in FIG. 2. Therefore, a network having a bandwidth of 600M bits/sec is required for each channel in the case of 8 multi-channel networks.

The operation of the present invention will now be described. Referring to FIG. 2, the geometry engine (GE) 210 receives three-dimensional object data from a host processor (not shown), and performs transformation, lighting for reflecting the effect of light to a color value, clipping, perspective projection and triangle division. Afterwards the geometry engine 210 transfers the generated data to an adjacent raster engine 220. The raster engine 220 calculates the color value, z-depth value and coordinates of each pixel processed in the geometry engine 210 and performs triangle rasteration, interpolation and bit block transmission. Then, the raster engine 220 transfers such data to an adjacent pixel distributor 230. The pixel distributor 230 receives data and checks a pixel address. If current data belongs to its own local frame buffer 240, the data is transmitted to the local frame buffer. On the other hand, if current data does not belong to its own local frame buffer 240 a token is generated, a valid/invalid bit and the size of data to be transmitted thereafter are set, and then, the token is sent to the ring network 250.

The reason why the token is sent to the ring network 250 before transmission of data is to give an exclusive access of the data to an intended receiver. Moreover, the pixelink ring network according to the present invention is a duplex linked ring network in which data can be transmitted clockwise and counterclockwise, so that the long latency of the ring network is reduced.

As described above, the present invention removes the burden that objects processed in a geometry engine must be sorted to be processed by a raster engine assigned to a sub-screen.

Also, a raster engine is assigned to a local frame buffer dynamically in a conventional system, which is difficult to control. In the present invention, however, because a local frame buffer is statically assigned to each raster engine, the difficulty of control is removed.

Moreover, in the present invention, local frame buffer are connected by a ring network architecture and a general memory system can be used. Thus, a special memory is not necessary. In addition, a geometry engine and a raster engine are incorporated into one unit, thereby facilitating object parallelism.

What is claimed is:

1. A multiprocessor graphics system having a pixel link architecture, comprising:

a plurality of sub-graphics systems each assigned to each of a plurality of sub-screens provided by sectioning a display screen; and a ring network for connecting said plurality of sub-graphics systems, wherein each of said sub-graphics systems comprises:

a geometry engine for receiving three dimensional object data from a host processor and performing a floating point operation including transformation, lighting of reflecting the effect of light on color, clipping, perspective projection and triangle division;

a raster engine for calculating the color value, a z-depth value and coordinates of each pixel processed in the geometry engine and performing triangle rasterization, interpolation and bit block transmission;

a local frame buffer for storing data belonging to a sub-screen assigned to said local frame buffer; and a pixel distributor for receiving data processed in said raster engine, checking a pixel address, storing said data in said local frame buffer if said pixel address belongs to its own local frame section, and transmitting said data to another sub-graphics system via said ring network if said pixel address does not belong to its own local frame section.

2. A multiprocessor graphics system having pixel link architecture according to claim 1, wherein said ring network is a duplex linked ring network for transmitting said data clockwise and counterclockwise and said pixel distributor controls transmission of said data so that said data is transmitted via an optimally short path in said duplex linked network when said data is transmitted to another sub-graphics system.

3. A multiprocessor graphics system having pixel link architecture according to claim 1, wherein said ring network transmits said data by using a token.

4. A multiprocessor graphics system having pixel link architecture according to claim 2, wherein said ring network transmits said data by using a token.

5. A multiprocessor graphics system, comprising:

a plurality of sub-graphics systems each assigned to each of a plurality of sub-screens provided by sectioning a display screen; and a ring network for connecting said plurality of sub-graphics systems, wherein each of said sub-graphics systems comprises:

a geometry engine for processing pixel data and outputting a first processing result;

a raster engine for processing the first processing result output by said geometry engine and outputting a second processing result;

a local frame buffer for storing data belonging to a sub-screen assigned to said local frame buffer; and a pixel distributor for receiving said second processing result output by said raster engine and performing one of storing said data in said local frame buffer and transmitting said data to another sub-graphics system via said ring network according to a pixel address associated with said second processing result.

6. A multiprocessor graphics system having pixel link architecture according to claim 5, wherein said ring network is a duplex linked ring network for transmitting said data clockwise and counterclockwise and said pixel distributor controls transmission of said data so that said data is transmitted via an optimally short path in said duplex linked network when said data is transmitted to another sub-graphics system.

7. A multiprocessor graphics system having pixel link architecture according to claim 5, wherein said ring network transmits said data by using a token.

8. A multiprocessor graphics system having pixel link architecture according to claim 6, wherein said ring network transmits said data by using a token.

* * * * *